United States Patent [19]

Savary

[11] Patent Number: 4,752,434
[45] Date of Patent: Jun. 21, 1988

[54] CONTROL BAR AND DRIVE MECHANISM COUPLING DEVICE

[75] Inventor: Fernand Savary, St Leu La Foret, France

[73] Assignee: Framatome, Courbevoie, France

[21] Appl. No.: 823,237

[22] Filed: Jan. 28, 1986

[30] Foreign Application Priority Data

Jan. 28, 1985 [FR] France ............................. 85 01123

[51] Int. Cl.$^4$ ................................................ G21C 7/06
[52] U.S. Cl. .................................... 376/233; 376/234; 376/239
[58] Field of Search ................. 376/233, 234, 239, 224

[56] References Cited

U.S. PATENT DOCUMENTS 4,124,442 11/1978 Zhuchkov ............................ 376/233
4,544,521 10/1985 Millot ................................. 376/233

Primary Examiner—Donald P. Walsh
Attorney, Agent, or Firm—Pollock Vande Sande & Priddy

[57] ABSTRACT

A coupling device between a nuclear reactor control rod and an actuating mechanism has a gripper body having resilient gripping fingers, belonging to the mechanism and, on the bar, a terminal pommel for engagement by the fingers and a shoulder directed towards the pommel. The coupling device comprises an additional member, such as a sleeve, movable with respect to the gripper body between a position in which it allows resilient fingers to be released from the pommel and another position in which it locks the resilient fingers onto the pommel. The sleeve has an end face bearing on the shoulder of the pommel. A prestressed spring exerts a force tending to move the sleeve away from the fingers so as to hold the end face of the sleeve firmly applied against the shoulder when the fingers are locked on the pommel.

10 Claims, 4 Drawing Sheets

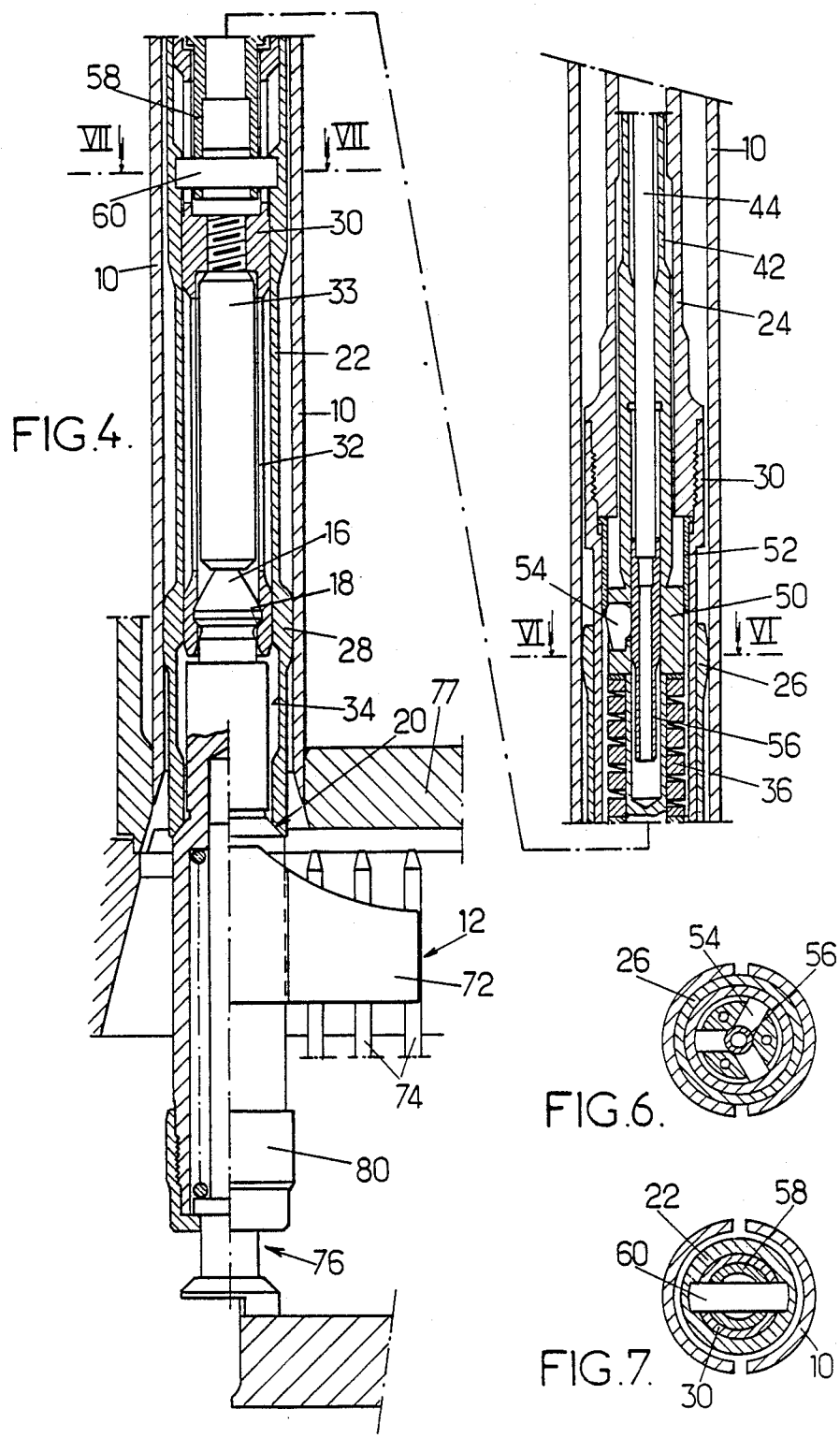

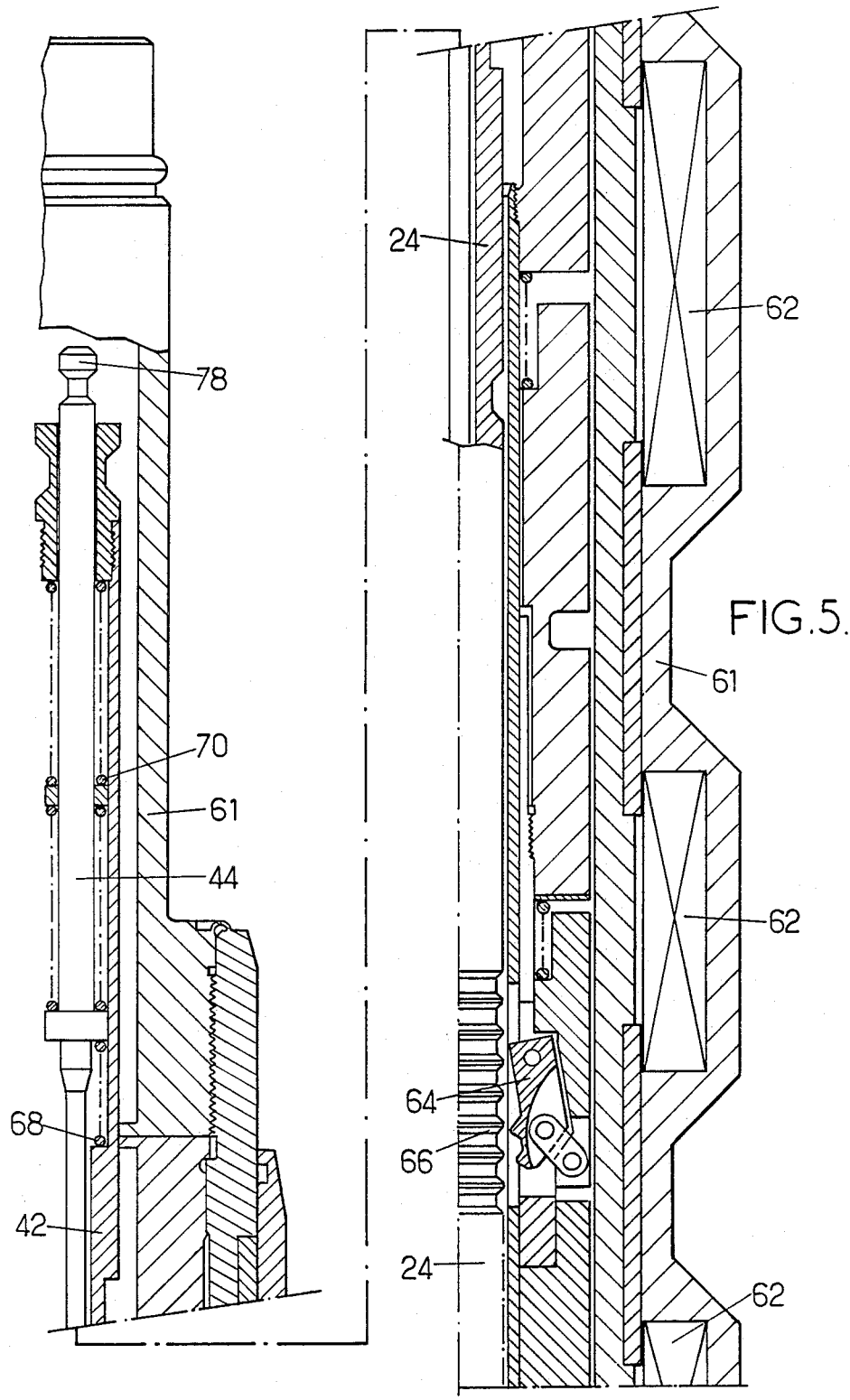

CONTROL BAR AND DRIVE MECHANISM COUPLING DEVICE

BACKGROUND OF THE INVENTION

The invention relates to a coupling device between an elongate control bar, with longitudinal movement, intended for a nuclear reactor and a mechanism for driving the bar. It finds a particularly important, although not exclusive, application in light water cooled moderated reactors, using control bars comprising a cluster of parallel elements, containing a neutron absorbing material, which elements have a great length and so considerable flexibility and are suspended, at their upper end, from a piece generally called "spider".

Control bar coupling devices are already known of the type comprising a gripper body having resilient gripping fingers, belonging to the mechanism and, on the bar, a terminal pommel for engagement by the fingers and a shoulder directed towards the pommel. The coupling device comprises an additional member, such as a sleeve, movable with respect to the gripper body between a position in which it allows resilient fingers to be released from the pommel and another position in which it locks the resilient fingers onto the pommel.

In all these known coupling devices, the bar is simply suspended from the drive mechanism. Because of the very slender shape of the elements, because of their construction (generally a stack of pellets in a thin sheath), because of the disymmetrie and of the diversity of means for guiding them, considerable vibrations may appear during operation of the reactor. The coupling device cannot absorb the forces having a torque with respect to an axis passing through the gripping zone. The resilient blades work under poor conditions since, because of their very shape, they are only adapted for withstanding tractive forces. The inevitable clearances risk causing oscilltions and vibrations in the vertical direction.

SUMMARY OF THE INVENTION

It is an object of the invention to provide a releasable coupling devince in which the pommel of the control bar and the drive mechanism are connected against movement in any direction and any longitudinal clearance is taken up and external torques can be absorbed.

To this end, there is provided a device of the above-defined type which comprises a sleeve movable with the mechanism, movable longitudinally with respect to the gripping fingers and having an end face bearingo n the shoulder of the pommel and comprises a prestressed spring exerting a force tending to move the sleeve away from the fingers so as to hold the end face of the sleeve firmly applied against the shoulder when the fingers are locked on the pommel.

The gripper body and the fingers may be slidably received in the sleeve. This latter may then be formed with a recess allowing the fingers to spread apart and to release the pommel when an external force is exerted against that of the prestressed spring and overcomes the prestress.

The gripper body may be associated with a central rod passing through the whole of the mechanism and having an abutting connection with a tubular rod, said abutting connection being situated at the end of the mechanism opposite said end face, the prestressed spring then being compressed between said tubular rod and the sleeve.

The embodiment which has just been described has the advantage of simplicity. On the other hand, it subjects the tubular rod to compression forces which may cause it to buckle. This buckling may however be limited by disposing the tubular rod under compression inside a drive shaft fast with the sleeve and which cooperates with external drive means for moving it longitudinally. the external drive means may be electromechanical means, numerous embodiments of which are known. Such means are for example described in French Pat. No. 1,371,802.

If it is desired to locate all components of the coupling device immediately above the pommel, it is possible to use another embodiment which involves no compression stress on rods or tubes or great length.

A device may more especially be used in which the sleeve is fast with a slide situated inside the gripper body and having a surface for abutting connection with one end of the prestressed spring bearing on a slider having a disengageable abutting connection with the gripper body.

The invention will be better understood from the following description of particular embodiments, given by way of examples. The description refers to the accompanyng drawings.

BRIEF DESCRIPTION OF THE DRAWINGS

FIG. 4 shows a coupling device according to another embodiment of the invention, in section through a vertical plane passing through the axis, the device being shown in coupled condition;

FIG. 5 is a half section of the top part of a drive mechanism provided with the device of FIG. 1;

FIGS. 6 and 7 are sectional views along lines VI—VI and VII—VII of FIG. 4;

DETAILED DESCRIPTION OF PARTICULAR EMBODIMENTS

Figure 1:
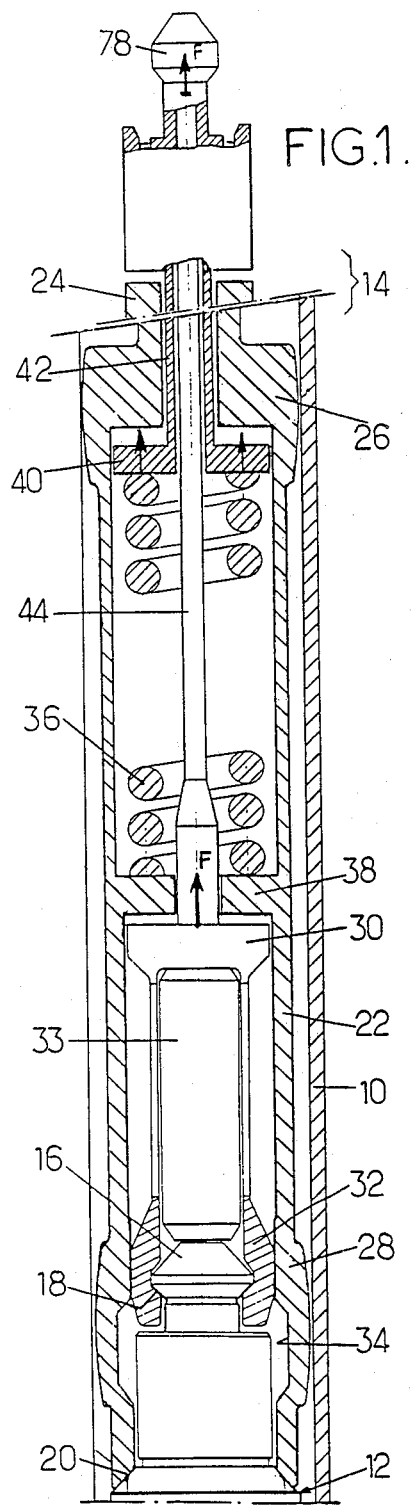
FIG. 1 shows diagrammatically a first embodiment of a coupling device in accordance with the invention, in section through a vertical plane passing through the axis thereof.
Figure 2:
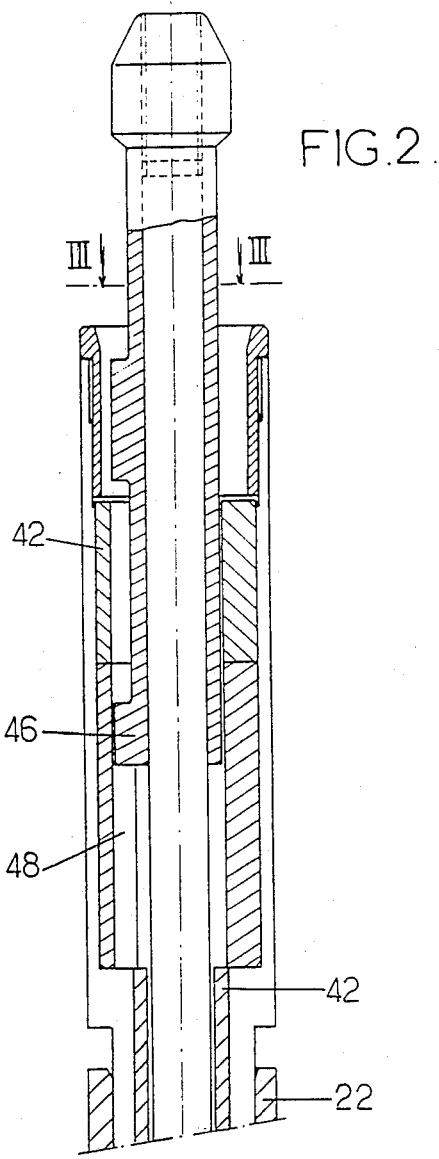
FIG. 2 is an enlarged view of a possible construction of the top part of FIG. 1.
Figure 3:
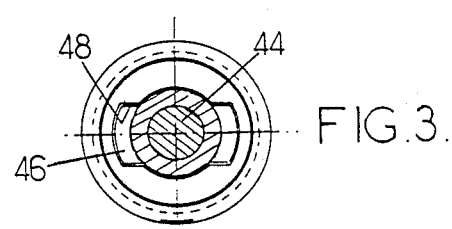
FIG. 3 is a sectional view through line III—III of FIG. 2.
Figure 8:
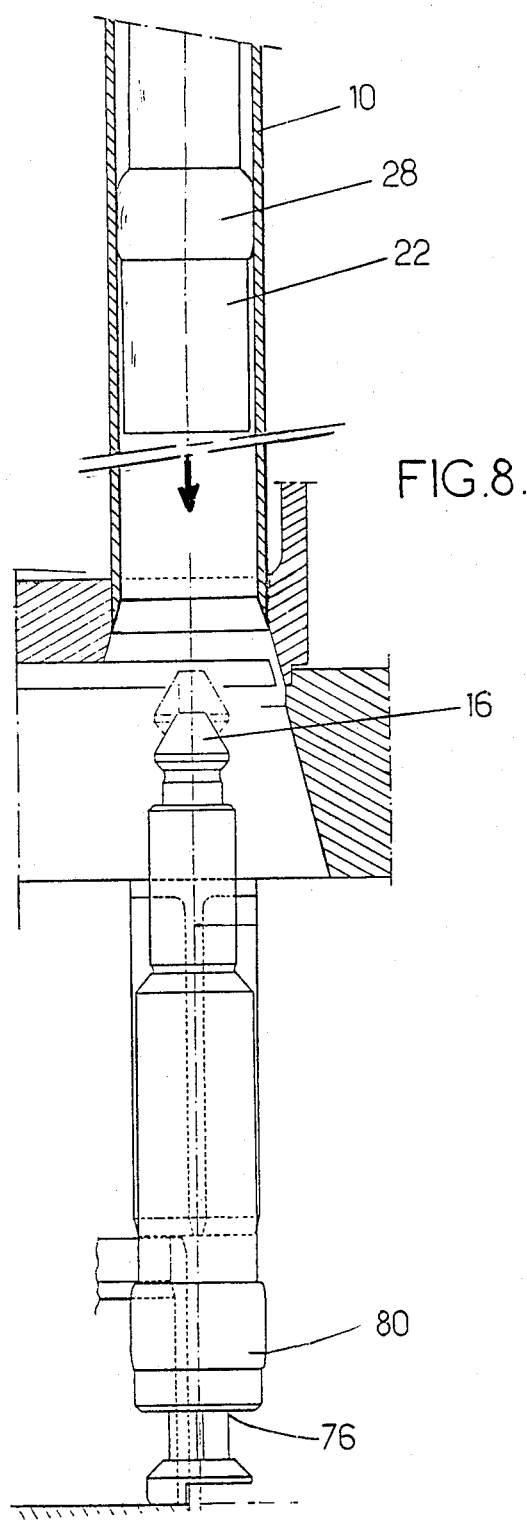
FIG. 8 is an elevational view of the coupling mechanism of FIG. 4, in the condition assumed while it is moved down towards the pommel of a cluster to be gripped.

- Referring to FIGS. 1-3, a coupling device is suitable for use in a nuclear reactor comprising a pressure vessel whose cover (not shown) is traversed by sleeves which each receive, externally to the vessel, means for controlling the movement and the position of a control bar.

The fixed internal equipment of the reactor comprises, in alignment with each sleeve, a tubular guide 10, a fraction of which is shown in FIG. 1. Guide 10 is generally secured to the upper core plate which is placed above the nuclear fuel assemblies (not shown) during operation of the reactor.

Referring to FIGS. 1-3, the coupling device of the invention is for connecting the upper part of a control bar 12, only the top end of which is shown, to a drive mechanism 14. The bar 12 comprises a "spider" not shown in the Figure, which has an upwardly projecting pommel 16 whose enlarged head has a downwardly turned frustoconical bearing surface 18. The extension of the spider is also formed with an upwardly directed frustoconical bearing face 20. Due to the use of conical surfaces, lateral contact reactions may be taken up and self centering of the sleeve and of the pommel is achieved, as will be seen later.

The mechanism 14 comprises a sleeve 22 having a sliding fit in the tubular guide 10 and a drive shaft 24 which extends upwardly through the sleeve so as to co-operate with the means controlling the movement and position of the bar. As shown in FIG. 1, sleeve 22 and control rod 24 are fast with each other. Sleeve 22 bears on the tubular guide 10 through guide shoes 26 and 28 spaced apart from each other so as to withstand rocking torques.

The coupling device further comprises a gripper body 30 movable longitudinally within and along sleeve 22. The gripper body is formed with a plurality of downwardly directed resilient gripping fingers 32. Each finger has a groove for locking on the pommel 16 and bearing on surface 18, as shown in FIG. 1. A core piece 33 placed in the body, between the fingers, limits the extent of flexure of the fingers. An annular recess 34 formed in sleeve 22 has dimensions such that the fingers may bend outwardly and release the pommel 16 whe the lower enlarged part of the fingers faces the recess. When, on the other hand, the enlarged part is located above the recess 34, as shown in FIG. 1, the fingers are held locked on pommel 16.

Prestressing of the coupling device is provided by a spring 36 compressed between an internal flange 38 of the sleeve and an endmost plate 40 of a tube 42 coaxial with the drive shaft 24 and placed inside the latter. The compression force of spring 36 is transmitted from tube 42 to the gripper body 30 through an axial rod 44 having means for retaining it on the tube in the position shown in FIG. 1. In this position, tube 42 transmits the force exerted by spring 36 to the axial rod 44 and that force biases the resilient fingers 32 away from the endmost frustoconical surface 20 of sleeve 22. It will be appreciated that rod 44 pulls the gripper body 30 upwardly. The maximum inertial force exerted on the total mass gripped by the gripper may be readily balanced with an acceptable prestressing force.

The fingers 32 of the gripper are firmly retained by their sliding abutment on the internal surface of the sleeve and they practically cannot bend, so that in practice they are subjected to a tractive force only. Alternate bending of the fingers is practically eliminated. The distance between surfaces 18 and 20 may be largely sufficient for absorbing the rocking torques under good conditions.

Buckling of tube 42 is of no consequence since it is limited by the tubular drive shaft 24 which is subjected to tractive stresses by the load which it supports.

The means for retaining rod 44 in abutment on tube 42 may have different constructions, for example that shown schematically in FIGS. 2 and 3 formed by keys 46 integral with rod 44 and slidably received in grooves 48 formed in the upper part of tube 42. The keys are retained by the upper surface of tube 42 when they are rotated after having been lifted above the level of the upper surface with a tool (not shown).

When it is desired to avoid transmititng compression forces along the drive mechanism, the embodiment shown in FIGS. 4 to 8 rather than that of FIGS. 1 to 3 may be used. In FIGS. 4–8, the parts corresponding to those already shown in FIG. 1 are designated by the same reference number.

The coupling device again comprises a gripper body 30 with a plurality of resilient fingers 32, generally four in number. When the coupling device is locked, endmost parts of the elastic fingers clamp the head of the pommel 16 and are retained by the wall of the bore in sleeve 22.

As shown in FIG. 4, members for transmitting the force exerted by the prestressed spring are slightly more complex than in the first embodiment.

(a) One of the ends of the prestressed spring 36 is in abutment against a slider 50. This slider is mounted with a sliding fit in an internal sleeve 52 of the gripper body 30, formed from several pieces assembled together. Radial slots in the slider contain three lockng cams 54 which are arranged so that a plunger 56 fixed to the end of the axial rod 44 may force them radially outwardly into a position where they retain the lower end face of sleeve 52.

The plunger 56 is fixed to the base of the axial rod 44 while slider 50 is fixed tthe base of tube 42 which, contrary to the tube 42 in FIG. 1, does not have to transmit the forces exerted by the prestressed spring 36.

(b) The other end of spring 36 has an abutting connection wit a slide 58 interlocked to sleeve 22 by a transverse pin 60.

The tubular drive shaft 24, separated from sleeve 22, extends along a sleeve 61 which contains the means for controlling the movement and position of the bar. Such means will not be described, for they may have any conventional construction, such as that already described in the above-mentioned French Patent. Referring to FIG. 5, the three coils 62 which operate axially movable pole pieces and ratchets 64 co-operating with grooves 66 on shaft 24 for moving the shaft are partially illustrated.

Referring to FIG. 5, rod 44 and tube 42 project upwardly beyond the tubular control rod 24. When the device is prestressed, the position of rod 44 with respect to tube 42 is determined by its abutment against a spring 68 of high stiffness so that its amount of deformation under stress will always remain small. Abutment is maintained by a return spring 70 which is of moderate (lower) stiffness. The two springs co-operate so as to absorb possible differential expansions between the central rod 44 and tube 42 due to heat. When the device is locked and under prestress, a fixed point of the central rod 44 is formed by the plunger 56 retained by abutment against the three locking cams 54.

By way of example a possible construction of the upper part of cluster 12 has been shown in FIG. 4. Spider 72 carrying the rods of neutron absorbing (or spectral shift material) is provided with a damper 76. The upper core plate 77 which carries the tubular guides 10 can also be seen in FIG. 4.

Since the operation of the device appears from its construction, only a very summary description thereof will now be given.

Uncoupling a. The uncoupling sequence is as follows.

First of all the control bar 12 is lowered until it is in the position shown in FIG. 4. Using a tool (not shown) which grips an endmost swelling 78 of rod 44, after opening the sleeve containing the electromagnetic means, the control rod 22 is slightly raised and tube 42 is pushed back so as to free the locking cams 54 which no longer receive the reaction of the abutment sleeve 52. The locking cams no longer exert a force on the plunger 56.

The tool may the pull the central rod 44 upwards by overcoming only the force exerted by the return spring 70 of moderate stiffness. As soon as the small diameter part of plunger 56 is in front of the locking cams 54, these latter may rock inwardly to completely release the gripping body 30. if the tool continues to raise the central body 44, this latter takes tube 42 along with it. When the cams pass over the conical ramp of sleeve 52, they are pushed back inwardly of the slider 50 and retract before sliding along the bore of sleeve 52. During the lifting movement, slider 50 intercepts slide 58 and consequently drives sleeve 22 in its rising movement as far as a top end-of-travel position.

Recess 34 in sleeve 22 is then opposite the enlarged portions of the resilient fingers 32 which may move apart for releasing pommel 16: the cluster slides downwards under the action of its own weight.

b. When the tool continues to raise the central rod 44, tube 42 and the tubular control rod 24 accompany it in its movement. The sleeve is thus raised above the pommel.

The tool may then lower sleeve 24 hitched to slider 50 to a low abutment position defined by an upper collar of slider 58 (FIG. 4). The prestress spring is relaxed and the locking cams are a little below sleeve 52. The central rod 44 may then be lowered by the tool.

The tool may finally lock the control rod in the internal equipment in a low position, by means not shown which may be of a type known per se.

It can be seen that once the separation is achieved, sleeve 22 is in a low position, with the gripping fingers 34 closed again.

Coupling

From the state thus reached, the coupling operations take place in the reverse order of the preceding ones.

At the beginning of the operation, the resilient fingers 32 are facing recess 34 in sleeve 22 and may move freely apart. The operations (b) are carried out in a reverse order. The movable assembly comprising sleeve 22 and the rods moves down as shown by arrow F in Figure 8. If, in the initial state, pommel 16 is not correctly aligned, the bearing force of the conical end face of sleeve 22 recenters it during engagement of the sleeve. When the resilient fingers come into contact with the head of pommel 16, they are pushed back outwardly by the conical surface of this head, pass beyond the gripping projection, then close again in the groove which follows it.

The top of the pommel then comes into contact with the core piece 33. At the end of lowering of the control rod 24, this rod rests on the pommel through the core piece 33.

The operations (a) are then carried out also in a reversed order then the tool may be removed.

The device which has just been described further comprises means for guiding the control bar in all its positions.

When the bar is in a position in which the pommel is situated outside the tubular guide 10, the bar is guided by shoes 26 and 28 of the sleeve. The distance between the abutment surfaces is then relatively small. But this situation, which is not the most favorable from the point of view of absorption of the torques, only exists when the control bar is almost totally engaged in the core and when the abutment takes place at the low part of the tubular guide, which undergoes no appreciable wear.

During normal operation of the reactor, the pommel is always entirely engaged in the channel. In this case, guiding is provided by the upper shoe 26 and by a shoe 80 placed at the bottom of the spider. So that shoe 28 does not disturb the guiding, it is given a diameter slightly smaller than that of shoe 80. In this case, the distance between abutments is considerable, which reduces correspondingly the abutment forces required for absorbing the torques applied.

The invention is susceptible of numerous other embodiments. For example, instead of placing the spider 72 in the immediate vicinity of the core plate 74 increasing the flexibility of the part of the rods situated above the core, it is possible to provide a spider situated in the immediate vicinity of the core when the bar is completely engaged. Other locking and unlocking solutions than those which have been described by way of examples may be adopted and it should of course be understood that the scope of the present patent extends to such variations as well as more generally as to all others remaining within the scope of equivalences.

I claim:

1. In a control bar assembly for a nuclear reactor, said control bar assembly having a vertically movable elongate control bar and a drive mechanism for vertically positioning said bar,
   a coupling device for releasibly coupling said mechanism and said bar, having :
   an endmost pommel and a shoulder formed on said bar, said shoulder being formed at a vertical distance under said pommel and facing upwardly,
   a vertically movable gripping body included in said mechanism and having a plurality of resilient gripping fingers for locking engagement with said pommel;
   a sleeve included in said mechanism and vertically movable with respect to said gripping body between a first position where a downwardly directed endmost face of said sleeve is in abutment against said shoulder and a second position clear of said shoulder, when said gripping fingers are locked on said pommel;
   controllable means for moving said sleeve away from said first position toward said second position; and
   resilient prestressing means in said mechanism arranged to exert a force in said sleeve biasing said sleeve vertically away from the fingers so as to maintain said downwardly directed endmost face of the sleeve in firm abutment against the shoulder when the fingers are locked on the pommel.

2. The device according to claim 1, wherein said gripper body and said fingers are slidably mounted in the sleeve and said sleeve is formed with a recess allowing the fingers to spread apart and to release the pommel upon application of an external force overcoming the prestress of said prestressing spring.

3. The device according to claim 1, wherein said endmost face of the sleeve and said shoulder have a flaring shape for taking up lateral reactions and causing self centering during engagement of the sleeve on the pommel.

4. The device according to claim 1, wherein the gripper body has a central rod trasversing the whole of the mechanism and having a releasable abutment connection with a tubular rod situated at that end of the mechanism which is remote from said enmost face, the prestressing spring being compressed between said tubular rod and said sleeve.

5. The device according to claim 4, further comprising a tubular control rod fast with the sleeve and which cooperates with external longitudinal drive means, said tubular rod being located within and along said tubular control rod.

6. The device according to claim 2, wherein said sleeve is fast with a slide situated inside the gripper body and having a surface for abutting engagement with one end of the prestressing spring and the other end of the prestressing spring bears on a slider having a releasable abutment connection with the gripper body.

7. The device according to claim 6, wherein the abutment connection comprises locking cams disposed in the slider cooperating with an abutment sleeve fast with the gripper body and wherein a central rod is mounted in the slider for movement between a position in which it holds the cams in engagement against the sleeve and a position in which it allows the cams to retract.

8. The device according to claim 7, wherein the central rod is coaxial to a tube fast with the slider and to a tubular control rod fast with the gripper body and cooperating with longitudinal drive means.

9. The device according to claim 8, whereint he central rod is held in abutment against the tube through a stiffer spring by a less stiff spring and the central rod and the tube project outside the tubular control rod so as to allow the central rod and the tube to be moved with respect to each other with a tool, against the action of the return spring.

10. The device according to claim 1, wherein the sleeve comprises shoes for slidably guiding the sleeve along a fixed tubular guide placed in alignment with the control bar.

* * * * *